(12) United States Patent
Zheng et al.

(10) Patent No.: US 11,741,660 B2
(45) Date of Patent: Aug. 29, 2023

(54) STRUCTURED LIGHT THREE-DIMENSIONAL MEASUREMENT DEVICE AND METHOD BASED ON DEFOCUS-DEGREE-BASED UNWRAPPING

(71) Applicant: Guangdong University of Technology, Guangzhou (CN)

(72) Inventors: Zhuojun Zheng, Guangzhou (CN); Jian Gao, Guangzhou (CN); Lanyu Zhang, Guangzhou (CN); Haixiang Deng, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 17/985,272

(22) Filed: Nov. 11, 2022

(65) Prior Publication Data

US 2023/0076442 A1 Mar. 9, 2023

(30) Foreign Application Priority Data

Apr. 24, 2022 (CN) .......................... 202210432993.4

(51) Int. Cl.
*G06T 15/08* (2011.01)
*G06T 15/00* (2011.01)

(52) U.S. Cl.
CPC ............ *G06T 15/08* (2013.01); *G06T 15/005* (2013.01)

(58) Field of Classification Search
None
See application file for complete search history.

(56) References Cited

U.S. PATENT DOCUMENTS

2010/0299103 A1 11/2010 Yoshikawa
2016/0261851 A1* 9/2016 Tian ..................... G01B 11/254

FOREIGN PATENT DOCUMENTS

| CN | 103047944 | * | 4/2014 | ............ G01B 11/25 |
|---|---|---|---|---|
| CN | 104897083 | A | 9/2015 | |
| CN | 106017357 | A | 10/2016 | |
| CN | 108680142 | A | 10/2018 | |
| CN | 109242897 | A | 1/2019 | |
| CN | 109579738 | A | 4/2019 | |
| CN | 111141232 | A | 5/2020 | |
| CN | 111750803 | A | 10/2020 | |
| CN | 112762858 | A | 5/2021 | |

(Continued)

OTHER PUBLICATIONS

Tong Jia et al., An Adaptive Defocus Three-Dimensional Measurement Method Based on Tabu Search and Combined Gray Code, IEEE Access, vol. 8, 14724-14736.

(Continued)

*Primary Examiner* — Andrew G Yang

(57) ABSTRACT

A structured light 3D measurement device and method based on defocus-degree-based unwrapping. Binary fringes varying in fringe width are projected onto an object, and a corresponding fringe image is collected by a camera, and then subjected to phase demodulation to calculate a wrapped phase. The defocus degree is calculated according to modulation degrees of the binary fringes. The defocus degree is plugged into the defocusing phase function to obtain a normalized reference phase. The wrapped phase is subjected to phase unwrapping based on the normalized reference phase to obtain an absolute phase to reconstruct a 3D point cloud.

8 Claims, 3 Drawing Sheets

(56) References Cited

FOREIGN PATENT DOCUMENTS

| CN | 113607085 A | 11/2021 |
|---|---|---|
| JP | 2008281491 A | 11/2008 |
| JP | 2009168789 A | 7/2009 |

OTHER PUBLICATIONS

Haohui Hu, Multi-view 3D Structured Light based Combined Binary Coding Defocusing Projection Measurement and System Implementation,China Excellent Doctoral Dissertation Full-Text Database (Master) Information Technology Series,pp. I138-1357.

Mengchao Ma et al., High speed 3-D shape measurement using projector defocusing, Chinese Journal of Scientific Instrument, Issue 10, 2017 2564-2572.

Yuanchao Liu et al., Study on Class Imbalance Based on Optical Wrapping Phase, Optics & Optoelectronic Technology, Issue 4, 2021, pp. 37-44.

* cited by examiner

STRUCTURED LIGHT THREE-DIMENSIONAL MEASUREMENT DEVICE AND METHOD BASED ON DEFOCUS-DEGREE-BASED UNWRAPPING

CROSS-REFERENCE TO RELATED APPLICATIONS

This application claims the benefit of priority from Chinese Patent Application No. 202210432993.4, filed on Apr. 24, 2022. The content of the aforementioned application, including any intervening amendments thereto, is incorporated herein by reference in its entirety.

TECHNICAL FIELD

The present disclosure relates to optical three-dimensional (3D) measurement, and more particularly to a structured light 3D measurement device and method based on defocus-degree-based unwrapping.

BACKGROUND

With the rapid development of projection and imaging technology, the structured light 3D measurement approach has been proposed, and extensively applied in the non-contact 3D measurement due to high efficiency, great precision and wide application range. The existing structured light 3D measurement methods are performed based on the binary fringe defocused projection.

Regarding the fringe binary defocused projection, the binary fringe is blurred into a standard sinusoidal fringe by means of defocusing effect. Excessive or insufficient defocusing of the binary fringe will lead to an increase in the wrapped phase error, and the unwrapping error will increase accordingly since the accuracy of the phase unwrapping is based on the precision of the wrapped phase. Currently, the commonly-used multi-frequency phase unwrapping method is dependent on the precision of the wrapped phase, and is susceptible to the wrapped phase error, failing to achieve the high-precision 3D measurement.

SUMMARY

The present disclosure provides a structured light 3D measurement device and method based on defocus-degree-based unwrapping to overcome the problems that the existing phase unwrapping methods are susceptible to the wrapped phase error, and fail to achieve the high-precision 3D measurement.

The technical solutions of the present disclosure are described as follows.

In a first aspect, the disclosure provides a structured light 3D measurement method based on defocus-degree-based unwrapping, comprising:

acquiring, by a camera, a fringe image generated after defocused projection of binary fringes varying in fringe width onto an object to be measured; and acquiring a defocusing phase function that has been calibrated before the defocused projection of the binary fringes, wherein the defocusing phase function is configured to represent a defocus degree-phase functional relationship;

subjecting the fringe image to phase demodulation by using a N-step phase-shifting method to obtain a wrapped phase;

calculating a defocus degree according to a modulation degree of the binary fringes; plugging the defocus degree into the defocusing phase function to obtain a normalized reference phase; and subjecting the wrapped phase to phase unwrapping based on the normalized reference phase to obtain an absolute phase; and reconstructing a 3D point cloud by triangulation according to the absolute phase.

In some embodiments, the defocus degree is calculated through the following formula:

$$\begin{bmatrix} 1 - \frac{2\pi^2}{T_1^2} \\ \vdots \\ 1 - \frac{2\pi^2}{T_m^2} \\ \vdots \\ 1 - \frac{2\pi^2}{T_M^2} \end{bmatrix} \times \begin{bmatrix} \ln\left(\frac{2a_2E}{\pi}\right) \\ \sigma_h^2 \end{bmatrix} = \ln\begin{bmatrix} B(T_1)' \\ \vdots \\ B(T_m)' \\ \vdots \\ B(T_M)' \end{bmatrix};$$

wherein $T_1$ is a fringe width of a first binary fringe in the binary fringes; $T_m$ is a fringe width of a $m^{th}$ binary fringe in the binary fringes; $T_M$ is a fringe width of a $M^{th}$ binary fringe in the binary fringes; M is the number of the binary fringes; $\sigma_h$ represents the defocus degree; $B(T_1)'$ is a modulation degree of the first binary fringe; $B(T_m)'$ is a modulation degree of the $m^{th}$ binary fringe; and $B(T_M)'$ is a modulation degree of the $M^{th}$ binary fringe.

In some embodiments, the defocusing phase function is expressed as follows:

$$\phi_r(u_c, v_c) = \frac{c(u_c, v_c)}{\sigma_h(u_c, v_c) + a(u_c, v_c)} + b(u_c, v_c);$$

wherein $(u_c, v_c)$ is a pixel coordinate of the camera; $\phi_r(u_c, v_c)$ is a normalized reference phase at the pixel coordinate $(u_c, v_c)$; $a(u_c, v_c)$, $b(u_c, v_c)$ and $c(u_c, v_c)$ are coefficients of the defocusing phase function at the pixel coordinate $(u_c, v_c)$; and $\sigma_h(u_c, v_c)$ is a defocus degree at the pixel coordinate $(u_c, v_c)$; and the phase unwrapping is performed according to the following formula:

$$\begin{cases} \phi'(u_c, v_c) = \varphi(u_c, v_c) + 2\pi \times K(u_c, v_c) \\ K(u_c, v_c) = round\left[\frac{\phi_r(u_c, v_c) \times \frac{2\pi w}{T} - \varphi(u_c, v_c)}{2\pi}\right] \end{cases};$$

wherein $\phi'(u_c, v_c)$ is the absolute phase; $\varphi(u_c, v_c)$ is the wrapped phase; $K(u_c, v_c)$ represents a fringe order of the fringe image; w is a maximum value of a projection coordinate; t represents fringe width; and round is a function that rounds a number to the nearest integer.

In a second aspect, the disclosure provides a structured light 3D measurement device based on defocus-degree-based unwrapping, comprising:

a memory; and
a processor;

wherein the memory is configured to store an instruction, wherein the instruction is configured to be executed to implement the above-mentioned structured light 3D measurement method; and the processor is configured to execute the instruction.

In a third aspect, the disclosure provides a non-transitory computer readable storage medium, wherein the non-transitory computer readable storage medium is configured to store a computer program; and the computer program is configured to be executed to implement the above-mentioned structured light 3D measurement method.

In a fourth aspect, the disclosure provides a structured light 3D measurement device based on defocus-degree-based unwrapping, comprising:

an acquisition module;
a wrapped phase solving module;
a phase unwrapping module;
a 3D measurement module;

wherein the acquisition module is configured to acquire a fringe image collected by a camera after defocused projection of binary fringes varying in fringe width onto an object to be measured, and a defocusing phase function that has been calibrated prior to the defocused projection, wherein the defocusing phase function is configured to represents a defocus degree-phase functional relationship;

the wrapped phase solving module is configured to perform phase demodulation on the fringe image based on a N-step phase-shifting method to obtain a wrapped phase;

the phase unwrapping module is configured to calculate a defocus degree according to a modulation degree of the binary fringes, plug the defocus degree into the defocusing phase function to obtain a normalized reference phase, and perform phase unwrapping on the wrapped phase based on the normalized reference phase to obtain an absolute phase; and the 3D measurement module is configured to reconstruct a 3D point cloud by triangulation according to the absolute phase.

In some embodiments, the phase unwrapping module comprises a defocus degree calculation unit, and the defocus degree calculation unit is configured to calculate the defocus degree through the following formula:

$$\begin{bmatrix} 1 & -\frac{2\pi^2}{T_1^2} \\ \vdots & \vdots \\ 1 & -\frac{2\pi^2}{T_m^2} \\ \vdots & \vdots \\ 1 & -\frac{2\pi^2}{T_M^2} \end{bmatrix} \times \begin{bmatrix} \ln\left(\frac{2a_2 E}{\pi}\right) \\ \sigma_h^2 \end{bmatrix} = \ln \begin{bmatrix} B(T_1)' \\ \vdots \\ B(T_m)' \\ \vdots \\ B(T_M)' \end{bmatrix};$$

wherein $T_1$ is a fringe width of a first binary fringe in the binary fringes; $T_m$ is a fringe width of a $m^{th}$ binary fringe in the binary fringes; $T_M$ is a fringe width of a $M^{th}$ binary fringe in the binary fringes; M is the number of the binary fringes; $\sigma_h$ is the defocus degree; $B(T_1)'$ is a modulation degree of the first binary fringe; $B(T_m)'$ is a modulation degree of the $m^{th}$ binary fringe; and $B(T_m)'$ is a modulation degree of the $M^{th}$ binary fringe.

In some embodiments, the phase unwrapping module comprises a normalized reference phase calculation unit and an absolute phase calculation unit;

the normalized reference phase calculation unit is configured to plug the defocus degree into the defocusing phase function to obtain the normalized reference phase, wherein the defocusing phase function is expressed as:

$$\phi_r(u_c, v_c) = \frac{c(u_c, v_c)}{\sigma_h(u_c, v_c) + a(u_c, v_c)} + b(u_c, v_c);$$

wherein $(u_c, v_c)$ is a pixel coordinate of the camera; $\phi_r(u_c, v_c)$ is a normalized reference phase at the pixel coordinate $(u_c, v_c)$; $a(u_c, v_c)$, $b(u_c, v_s)$ and $c(u_s, v_c)$ are coefficients of the defocusing phase function at the pixel coordinate $(u_c, v_c)$; and $\sigma_h(u_c, v_c)$ is a defocus degree at the pixel coordinate $(u_c, v_c)$; and the absolute phase calculation unit is configured to perform phase unwrapping based on the normalized reference phase through the following formula to obtain the absolute phase:

$$\begin{cases} \phi'(u_c, v_c) = \varphi(u_c, v_c) + 2\pi \times K(u_c, v_c) \\ K(u_c, v_c) = round\left[\dfrac{\phi_r(u_c, v_c) \times \dfrac{2\pi w}{T} - \varphi(u_c, v_c)}{2\pi}\right] \end{cases};$$

wherein 99 '$(u_c, v_c)$ is the absolute phase; $\varphi(u_c, v_c)$ is the wrapped phase; $K(u_c, v_c)$ represents a fringe order of the fringe image; w is a maximum value of a projection coordinate; t represents fringe width; round is a function that rounds a number to the nearest integer.

In a fifth aspect, the disclosure provides a structured light 3D measurement method based on defocus-degree-based unwrapping, comprising:

determining whether a defocusing phase function has been calibrated; if yes, projecting, by a projector, binary fringes varying in fringe width onto an object to be measured through defocused projection; and collecting, by a camera, a fringe image of the binary fringes;

subjecting the fringe image to phase demodulation by using a N-step phase-shifting method to obtain a wrapped phase;

calculating a defocus degree according to a modulation degree of the binary fringes; plugging the defocus degree into the defocusing phase function to obtain a normalized reference phase; and subjecting the wrapped phase to phase unwrapping based on the normalized reference phase to obtain an absolute phase; and reconstructing a 3D point cloud by triangulation according to the absolute phase.

In some embodiments, the structured light 3D measurement method further comprises:

if the defocusing phase function has not been calibrated, taking a plane as the object to be measured, and locating the plane at a side of a focusing plane; adjusting a height of the plane relative to the projector; and calculating the absolute phase through the N-step phase-shifting method as the normalized reference phase; and taking a pixel coordinate of the camera as position unit, and recording defocus degrees under different position units and corresponding normalized reference phases to construct an expression of the defocusing phase function; and based on the expression, calibrating coefficients of the defocusing phase function at different pixel coordinates by a least-squares method.

In some embodiments, the expression of the defocusing phase function is expressed as:

$$\underbrace{\begin{bmatrix} \sigma_1(u_c, v_c) & -\phi_1(u_c, v_c) & 1 \\ \vdots & \vdots & \vdots \\ \sigma_j(u_c, v_c) & -\phi_j(u_c, v_c) & 1 \\ \vdots & \vdots & \vdots \\ \sigma_J(u_c, v_c) & -\phi_J(u_c, v_c) & 1 \end{bmatrix}}_{A} \times \begin{bmatrix} b(u_c, v_c) \\ a(u_c, v_c) \\ c(u_c, v_c) + b(u_c, v_c)a(u_c, v_c) \end{bmatrix} =$$

-continued $$\begin{bmatrix} \phi_1(u_c, v_c)\sigma_1(u_c, v_c) \\ \vdots \\ \phi_j(u_c, v_c)\sigma_j(u_c, v_c) \\ \vdots \\ \phi_J(u_c, v_c)\sigma_J(u_c, v_c) \end{bmatrix}_F;$$

wherein $\sigma_1(u_c, v_c)$, $\sigma_j(u_c, v_c)$ and $\sigma_J(u_c, v_c)$ represent defocus degrees recorded at different heights of the plane relative to the projector at a pixel coordinate $(u_c, v_c)$; J represents a total number of heights under which defocus degrees are recorded; $\phi_1(u_c, v_c)$, $\phi_j(u_c, v_c)$ and $\phi_J(u_c, v_c)$ are normalized reference phases at the pixel coordinate $(u_c, v_c)$; A and F are matrices; and $a(u_c, v_c)$, $b(u_c, v_c)$ and $c(u_c, v_c)$ are coefficients of the defocusing phase function at the pixel coordinate $(u_c, v_c)$; and the coefficients of the defocusing phase function at the pixel coordinate $(u_c, v_c)$ are calibrated through the following formula:

$$\begin{bmatrix} b(u_c, v_c) \\ a(u_c, v_c) \\ c(u_c, v_c) + b(u_c, v_c)a(u_c, v_c) \end{bmatrix} = (AA^T)^{-1}A^T F;$$

wherein $A^T$ is transpose of matrix A.

The present disclosure has the following beneficial effects.

Based on mathematical analysis of defocus degree and phase, a concept of defocus phase function is proposed for representing defocus degree-phase functional relationship. Binary fringes varying in fringe width are projected onto an object, and a corresponding fringe image is collected by a camera, and then subjected to phase demodulation to calculate a wrapped phase. The defocus degree is calculated according to modulation degrees of the binary fringes. The defocus degree is plugged into the defocusing phase function to obtain a normalized reference phase. The wrapped phase is subjected to phase unwrapping based on the normalized reference phase to obtain an absolute phase to reconstruct a 3D point cloud. Comparing with the multi-wavelength phase unwrapping method which relies on phase accuracy, the method provided herein is free of influence of phase error, such that a high-accuracy 3D measurement can be achieved even there are large phase error due to great depth variation.

BRIEF DESCRIPTION OF THE DRAWINGS

Technical solutions of the present disclosure and the prior art will be described below with reference to the accompany drawings to facilitate the understanding. Obviously, the accompany drawings described below are merely some embodiments of the present disclosure, and other drawings can be obtained by those skilled in the art based on the drawings provided herein without paying creative effort.

Figure 1:
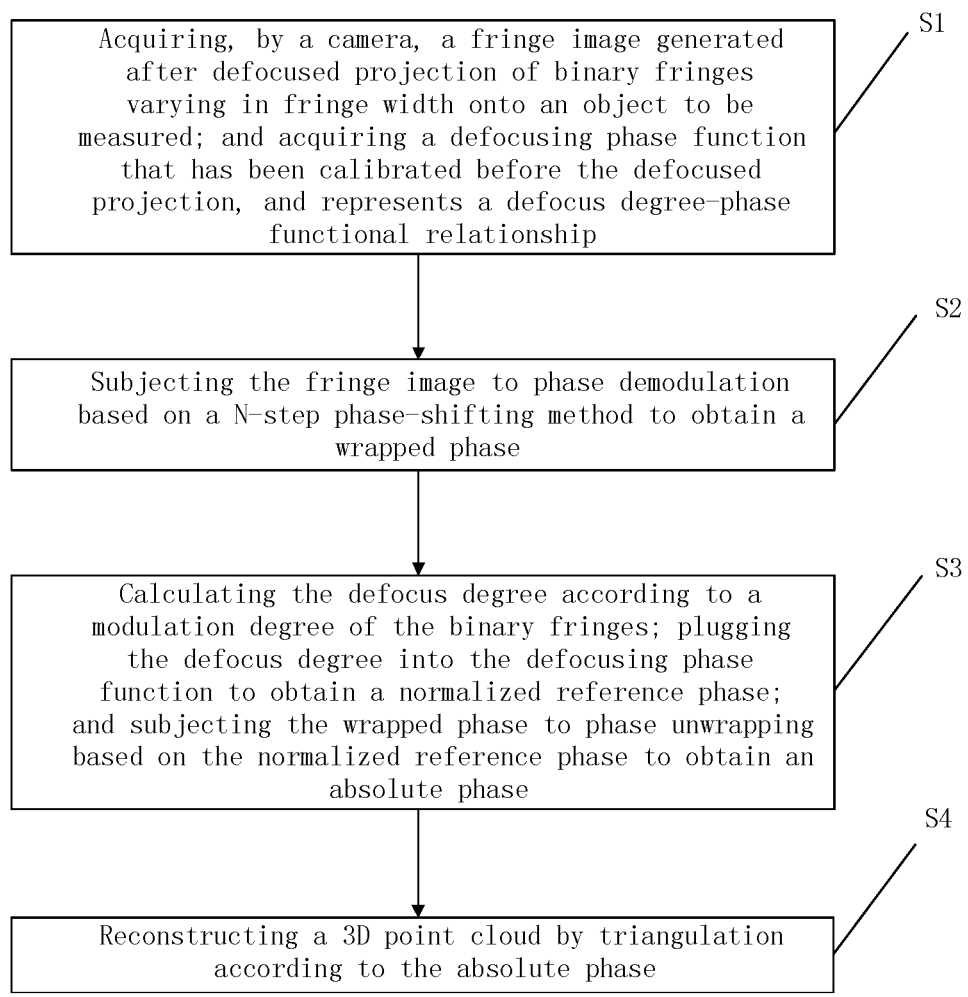
FIG. 1 is a flow chart of a structured light 3D measurement method based on defocus-degree-based unwrapping according to an embodiment of the present disclosure.

In the drawings: 1, acquisition module; 2, wrapped phase solving module; 3, phase unwrapping module; and 4, 3D measurement module.

DETAILED DESCRIPTION OF EMBODIMENTS

The present disclosure provides a structured light 3D measurement device and method based on defocus-degree-based unwrapping to overcome the problems that the existing phase unwrapping methods are susceptible to the wrapped phase error, and fail to achieve the high-precision 3D measurement.

The present disclosure will be described in detail below with reference to the embodiments and accompanying drawings to make objects, features and advantages of the present disclosure more apparent and understandable. Obviously, described below are merely some embodiments of this disclosure, and are not intended to limit the disclosure. Other embodiments obtained by those skilled in the art based on the embodiments provided herein without paying any creative effort should fall within the scope of the present disclosure.

Referring to FIG. 1, a structured light 3D measurement method based on defocus-degree-based unwrapping includes the following steps.

(S1) A fringe image is collected by a camera after defocused projection of binary fringes varying in fringe width onto an object to be measured. A defocusing phase function that has been calibrated before the defocused projection is acquired, where the defocusing phase function represents a defocus degree-phase functional relationship.

A projector can generate the binary fringes varying in fringe width based on the following formula, and then project the binary fringes onto the object to be measured:

$$\begin{cases} I_n^s(u_p, v_p) = E/2 \times \left[1 + \cos\left(\frac{2\pi}{T}x + sn\right)\right] \\ I_n^p(u_p, v_p) = \begin{cases} 0, & I_n^s(u_p, v_p) < E/2 \\ E, & I_n^s(u_p, v_p) \geq E/2 \end{cases} \end{cases};$$

where $(u_p, v_p)$ is a pixel coordinate of a binary fringe; $I_n^s(u_p, v_p)$ represents a sinusoidal fringe pattern; $I_n^p(u_p, v_p)$ represents a binary fringe generated through binarization of the sinusoidal fringe pattern $I_n^s(u_p, v_p)$; n is a sequence number of a fringe pattern; s is a phase shift parameter, and s=2π/N; N is the number of the binary fringes projected onto the object to be measured; T represents fringe width; and E is a maximum gray-scale value of the binary fringes varying in fringe width.

In this embodiment, the desired binary fringes can be generated quickly.

The binary fringe $I_n^p$ can be expressed as a cosine function:

$$I_n^p = \frac{E}{2} + \frac{2E}{\pi}\sum_{i=1}^{\infty}\frac{(-1)^{i+1}}{2i-1}\cos[(2i-1)(\varphi + sn)];$$

where i is a cosine function sequence number; and φ is a modulated phase.

The binary fringe is blurred into a sinusoidal fringe by means of defocusing effect of projection. An effect of defocus on projected fringes is approximated by Gaussian filtering. Since a convolution in a spatial domain is equivalent to a frequency domain multiplication, a binary fringe after defocus is expressed as follows:

$$L^d = I^p \otimes \frac{1}{\sqrt{2\pi}\,\sigma_h} e^{-\frac{(u_p^2+v_p^2)}{2\sigma_h^2}};$$

where $L^d$ is the binary fringe after defocus; $I^p$ is a binary fringe before defocus; and $\sigma_h$ represents a standard deviation of a point spread function, that is, a defocus degree of projection.

A modulation degree decay coefficient is introduced to convert the binary fringe after defocused, expressed as follows:

$$L_n^d(u_p, v_p) = \frac{E}{2} + \frac{2E}{\pi} \sum_{i=1}^{\infty} d^{(2i-1)^2} \frac{(-1)^{i+1}}{2i-1} \cos[(2i-1)(\varphi+sn)];$$

wherein n represents a sequence number of the binary fringe after defocused; $L_n^d(u_p, v_p)$ is the binary fringe after defocused; $(u_p, v_p)$ is a pixel coordinate of the binary fringe after defocused; and d is the modulation degree decay coefficient.

A relationship between the modulation degree decay coefficient and a modulation degree is expressed as follows:

$$d = e^{-\frac{2\pi^2 \sigma_d^2}{T^2}};$$

where $\sigma_d$ represents the defocus degree, and is equal to the standard deviation of the point spread function; and T is a fringe width.

(S2) The fringe image is subjected to phase demodulation by using a N-step phase-shifting method to obtain a wrapped phase.

The phase demodulation is performed with reference to prior art but not limited here.

The binary fringes are subjected to defocus of projection, object reflection and camera response to obtain the fringe image, which is expressed as follows:

$$L_n' = a_0 + \Delta a_n + \frac{a_1 E}{\pi} + \frac{2a_2 E}{\pi} \sum_{i=1}^{\infty} d^{(2i-1)^2} \frac{(-1)^{i+1}}{2i-1} \cos[(2i-1)(\varphi+sn)];$$

where $L_n'$ is the fringe image; $a_0$ is an external light intensity; $a_1$ is a response parameter of a direct current (DC) component; $a_2$ is a response parameter of a harmonic signal; and $\Delta a_n$ is stochastic noise of the camera.

The defocusing phase function is required to be calibrated before defocused projection. Based on the calibrated defocusing phase function, the binary fringes are projected onto the object to be measured by means of the projector or other equipment capable of transmitting and projecting, so as to collect the fringe image by the camera.

The defocusing phase function is calibrated through the following steps.

A plane is taken as an object to be measured. The plane is located at a side of a focusing plane, and a height of the plane relative to the projector is adjusted. An absolute phase is calculated by using the N-step phase-shifting method, and then taken as the normalized reference phase.

A pixel coordinate of the camera is taken as a position unit. The defocus degrees at different position units and corresponding normalized reference phases are recorded. An expression of the defocusing phase function is constructed. Based on the expression, coefficients of the defocusing phase function at different pixel coordinates are calibrated by a least squares method.

In an embodiment, the expression of the defocusing phase function is expressed as:

$$\underbrace{\begin{bmatrix} \sigma_1(u_c, v_c) & -\phi_1(u_c, v_c) & 1 \\ \vdots & \vdots & \vdots \\ \sigma_j(u_c, v_c) & -\phi_j(u_c, v_c) & 1 \\ \vdots & \vdots & \vdots \\ \sigma_J(u_c, v_c) & -\phi_J(u_c, v_c) & 1 \end{bmatrix}}_{A} \times \begin{bmatrix} b(u_c, v_c) \\ a(u_c, v_c) \\ c(u_c, v_c) + b(u_c, v_c)a(u_c, v_c) \end{bmatrix} =$$

$$\underbrace{\begin{bmatrix} \phi_1(u_c, v_c)\sigma_1(u_c, v_c) \\ \vdots \\ \phi_j(u_c, v_c)\sigma_j(u_c, v_c) \\ \vdots \\ \phi_J(u_c, v_c)\sigma_J(u_c, v_c) \end{bmatrix}}_{F};$$

where $\sigma_1(u_c, v_c)$, $\sigma_j(u_c, v_c)$ and a $\sigma_J(u_c, v_c)$ represent defocus degrees recorded at different heights of the plane relative to the projector at a pixel coordinate $(u_c, v_c)$; J represents a total number of heights under which defocus degrees are recorded; $\phi_1(u_c, v_c)$, $\phi_j(u_c, v_c)$ and $\phi_J(u_c, v_c)$ are normalized reference phases at the pixel coordinate $(u_c, v_c)$; A and F are matrices; and $a(u_c, v_c)$, $b(u_c, v_c)$ and $c(u_c, v_c)$ are coefficients of the defocusing phase function at the pixel coordinate $(u_c, v_c)$.

The coefficients of the defocusing phase function at the pixel coordinate $(u_c, v_c)$ are calibrated through the following formula:

$$\begin{bmatrix} b(u_c, v_c) \\ a(u_c, v_c) \\ c(u_c, v_c) + b(u_c, v_c)a(u_c, v_c) \end{bmatrix} = (AA^T)^{-1} A^T F;$$

where $A^T$ is transpose of matrix A.

In this embodiment, the calibration of the defocusing phase function is simple and convenient, and accurate coefficients can be obtained, facilitating subsequent calculation for an absolute phase.

(S3) The defocus degree is calculated according to a modulation degree of the binary fringes. The defocus degree is plugged into the defocusing phase function to obtain a normalized reference phase. The wrapped phase is subjected to phase unwrapping based on the normalized reference phase to obtain the absolute phase.

The modulation degree of the different binary fringes is obtained according to a modulation degree formula in prior art, which is not limited here.

The defocus degree is calculated through the following formula:

$$\begin{bmatrix} 1 & -\frac{2\pi^2}{T_1^2} \\ \vdots & \vdots \\ 1 & -\frac{2\pi^2}{T_m^2} \\ \vdots & \vdots \\ 1 & -\frac{2\pi^2}{T_M^2} \end{bmatrix} \times \begin{bmatrix} \ln\left(\frac{2a_2E}{\pi}\right) \\ \sigma_h^2 \end{bmatrix} = \ln\begin{bmatrix} B(T_1)' \\ \vdots \\ B(T_m)' \\ \vdots \\ B(T_M)' \end{bmatrix};$$

where $T_1$ is a fringe width of a first binary fringe in the binary fringes; $T_m$ is a fringe width of a $m^{th}$ binary fringe in the binary fringes; $T_M$ is a fringe width of a $M^{th}$ binary fringe in the binary fringes; M is the number of the binary fringes; $\sigma_h$ represents the defocus degree; $B(T_1)'$ is a modulation degree of the first binary fringe; $B(T_m)'$ is a modulation degree of the $m^{th}$ binary fringe; and $B(T_M)'$ is a modulation degree of the $M^{th}$ binary fringe.

The relationship between modulation degree and defocus degree provided herein improves a defocus degree calculation and 3D measurement efficiency.

In order to obtain the expression of the defocusing phase function, a derivative analysis for a functional relationship between the defocus degree and the phase is performed.

According to an image-forming principle of the camera, a relationship between 3D coordinates and two-dimensional (2D) coordinates is expressed as follows:

$$\begin{cases} S_c[u_c, v_c, 1]^T = A_c[R_c \ T_c] \times [x_w, y_w, z_w, 1]^T \\ S_p[u_p, v_p, 1]^T = A_p[R_p \ T_p] \times [x_w, y_w, z_w, 1]^T \end{cases};$$

where $(u_c, v_c)$ is a pixel coordinate of the camera; $(u_p, v_p)$ is a pixel coordinate of the projector; $(x_w, y_w, z_w)$ is a 3D coordinate in a world coordinate system; $[R_c \ T_c]$ is a camera extrinsic; $[R_p \ T_p]$ is a projector extrinsic; $A_c$ is a camera intrinsic parameter; $A_p$ is a projector intrinsic parameter; $S_c$ is a distance between the camera and the object to be measured; and $S_p$ is a distance between the projector and the object to be measured.

A relationship between the pixel coordinate of the projector and an imaging distance is expressed as follows:

$$P_{3\times 1} = A_p R_p R_c^{-1} A_c^{-1} [u_c, v_c, 1]^T.$$

The relationship is transformed to:

$$\underbrace{\begin{bmatrix} 1 & 0 & \\ 0 & 1 & P_{3\times 1} \\ 0 & 0 & \end{bmatrix}}_{\alpha} \begin{bmatrix} u_p \\ v_p \\ -S_c/S_p \end{bmatrix} = \frac{1}{S_p} \underbrace{A_p R_p \times (R_p^{-1} T_p - R_c^{-1} T_c)}_{\beta} - \begin{bmatrix} 0 \\ 0 \\ 1 \end{bmatrix}.$$

Then, the relationship is further transformed to:

$$\begin{bmatrix} u_p \\ v_p \\ -S_c/S_p \end{bmatrix} = \frac{1}{S_p}\alpha^{-1}\beta - \alpha^{-1}[0 \ 0 \ 1]^T.$$

In consequence, a relationship is obtained, expressed as:

$$\phi = \frac{1}{\Omega}[u_p \ v_p] = \frac{K}{S_p} + G;$$

where $\phi$ is the absolute phase after normalization; $\Omega$ is the number of a micropolariscope in a modulation direction of digtial micromirror devices (DMD); and K and G are coefficients to be determined as a function of phase and object distance.

According to the relationship between the defocus degree and an object distance analyzed from the optical point of view, a discrete circle and a lens diameter form a similar triangle. Therefore, a radius of the discrete circle is expressed as follows:

$$R = 3\sigma_h = \frac{D}{2} \times \left|\frac{S_p}{H} - 1\right|;$$

where R is the radius of the discrete circle; H is a distance from focusing plane; D is the object distance; and $\sigma_h$ is the defocus degree.

Accordingly, the defocusing phase function is expressed as follows:

$$\phi_r(u_c, v_c) = \frac{c(u_c, v_c)}{\sigma_h(u_c, v_c) + a(u_c, v_c)} + b(u_c, v_c);$$

where $(u_c, v_c)$ is a pixel coordinate of the camera; $\phi_r(u_c, v_c)$ is a normalized reference phase at the pixel coordinate $(u_c, v_c)$; $a(u_c, v_c)$, $b(u_c, v_c)$ and $c(u_c, v_c)$ are coefficients of the defocusing phase function at the pixel coordinate $(u_c, v_c)$; and $\sigma_h(u_c, v_c)$ is a defocus degree at the pixel coordinate $(u_c, v_c)$.

In an embodiment, the defocus degree is plugged into the defocusing phase function to obtain the normalized reference phase.

In an embodiment, the phase unwrapping is performed according to the following formula:

$$\begin{cases} \phi'(u_c, v_c) = \varphi(u_c, v_c) + 2\pi \times K(u_c, v_c) \\ K(u_c, v_c) = \text{round}\left[\frac{\phi_r(u_c, v_c) \times \frac{2\pi w}{T} - \varphi(u_c, v_c)}{2\pi}\right] \end{cases};$$

where $\phi'(u_c, v_c)$ is the absolute phase; $\varphi(u_c, v_c)$ is the wrapped phase; $K(u_c, v_c)$ represents a fringe order of the fringe image; w is a maximum value of a projection coordinate; t represents fringe width; and round is a function that rounds a number to the nearest integer.

The maximum value of the projection coordinate is a total number of pixels in one direction in a liquid crystal display (LCD) or DMD of the projector. For example, if a resolution of display is 1280×800, then w=1280.

(S4) A 3D point cloud is reconstructed by triangulation according to the absolute phase.

Provided herein is a structured light 3D measurement device based on defocus-degree-based unwrapping, including a memory and a processor.

The memory is configured to store an instruction, where the instruction is configured to be executed to implement the structured light 3D measurement method. The processor is configured to execute the instruction.

Provided herein is a non-transitory computer readable storage medium. The non-transitory computer readable storage medium is configured to store a computer program. The computer program is configured to be executed to implement the structured light 3D measurement method.

Provided herein is a structured light 3D measurement device based on defocus-degree-based unwrapping, which is configured to implement the structured light 3D measurement method.

Figure 2:
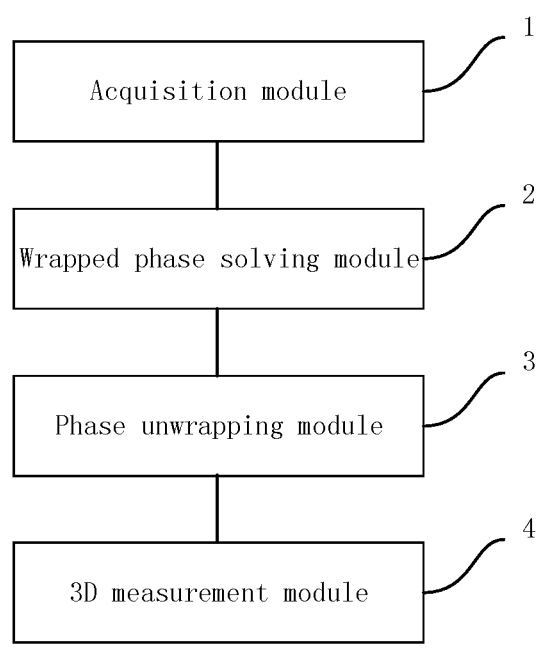
FIG. 2 is a block diagram of a structured light 3D measurement device based on defocus-degree-based unwrapping according to an embodiment of the present disclosure.

The principle of the structured light 3D measurement device based on defocus-degree-based unwrapping is schematically shown in FIG. 2.

The structured light 3D measurement device includes an acquisition module 1, a wrapped phase solving module 2, a phase unwrapping module 3 and a 3D measurement module 4.

The acquisition module 1 is configured to acquire a fringe image collected by a camera after defocused projection of binary fringes varying in fringe width onto an object to be measured, and a defocusing phase function that has been calibrated prior to the defocused projection, where the defocusing phase function is configured to represents a defocus degree-phase functional relationship.

The wrapped phase solving module 2 is configured to perform phase demodulation on the fringe image based on a N-step phase-shifting method to obtain a wrapped phase.

The phase unwrapping module 3 is configured to calculate a defocus degree according to a modulation degree of the binary fringes, plug the defocus degree into the defocusing phase function to obtain a normalized reference phase, and perform phase unwrapping on the wrapped phase based on the normalized reference phase to obtain an absolute phase.

The 3D measurement module 4 is configured to reconstruct a 3D point cloud by triangulation according to the absolute phase.

In an embodiment, the phase unwrapping module 3 includes a defocus degree calculation unit, and the defocus degree calculation unit is configured to calculate the defocus degree through the following formula:

$$\begin{bmatrix} 1 & -\frac{2\pi^2}{T_1^2} \\ \vdots & \vdots \\ 1 & -\frac{2\pi^2}{T_m^2} \\ \vdots & \vdots \\ 1 & -\frac{2\pi^2}{T_M^2} \end{bmatrix} \times \begin{bmatrix} \ln\left(\frac{2a_2E}{\pi}\right) \\ \sigma_h^2 \end{bmatrix} = \ln\begin{bmatrix} B(T_1)' \\ \vdots \\ B(T_m)' \\ \vdots \\ B(T_M)' \end{bmatrix};$$

where $T_1$ is a fringe width of a first binary fringe in the binary fringes; $T_m$ is a fringe width of a $m^{th}$ binary fringe in the binary fringes; $T_M$ is a fringe width of a $M^{th}$ binary fringe in the binary fringes; M is the number of the binary fringes; $\sigma_h$ is the defocus degree; $B(T_1)'$ is a modulation degree of the first binary fringe; $B(T_m)'$ is a modulation degree of the $m^{th}$ binary fringe; and $B(T_m)'$ is a modulation degree of the $M^{th}$ binary fringe.

In an embodiment, the phase unwrapping module 3 includes a normalized reference phase calculation unit and an absolute phase calculation unit.

The normalized reference phase calculation unit is configured to plug the defocus degree into the defocusing phase function to obtain the normalized reference phase, wherein the defocusing phase function is expressed as:

$$\phi_r(u_c, v_c) = \frac{c(u_c, v_c)}{\sigma_h(u_c, v_c) + a(u_c, v_c)} + b(u_c, v_c);$$

where $(u_c, v_c)$ is a pixel coordinate of the camera; $\phi_r(u_c, v_c)$ is a normalized reference phase at the pixel coordinate $(u_c, v_c)$; $a(u_c, v_c)$, $b(u_c,v_c)$ and $c(u_c, v_c)$ are coefficients of the defocusing phase function at the pixel coordinate $(u_c, v_c)$; and $\sigma_h(u_c, v_c)$ is a defocus degree at the pixel coordinate $(u_c, v_c)$.

The absolute phase calculation unit is configured to perform phase unwrapping based on the normalized reference phase through the following formula to obtain the absolute phase:

$$\begin{cases} \phi'(u_c, v_c) = \varphi(u_c, v_c) + 2\pi \times K(u_c, v_c) \\ K(u_c, v_c) = \text{round}\left[\frac{\phi_r(u_c, v_c) \times \frac{2\pi w}{T} - \varphi(u_c, v_c)}{2\pi}\right] \end{cases};$$

where $\phi'(u_c, v_c)$ is the absolute phase; $\varphi(u_c, v_c)$ is the wrapped phase; $K(u_c,v_c)$ represents a fringe order of the fringe image; w is a maximum value of a projection coordinate; t represents fringe width; round is a function that rounds a number to the nearest integer.

Reference can be made to the method embodiment for the specific working process and beneficial effects of these devices and modules.

Figure 3:
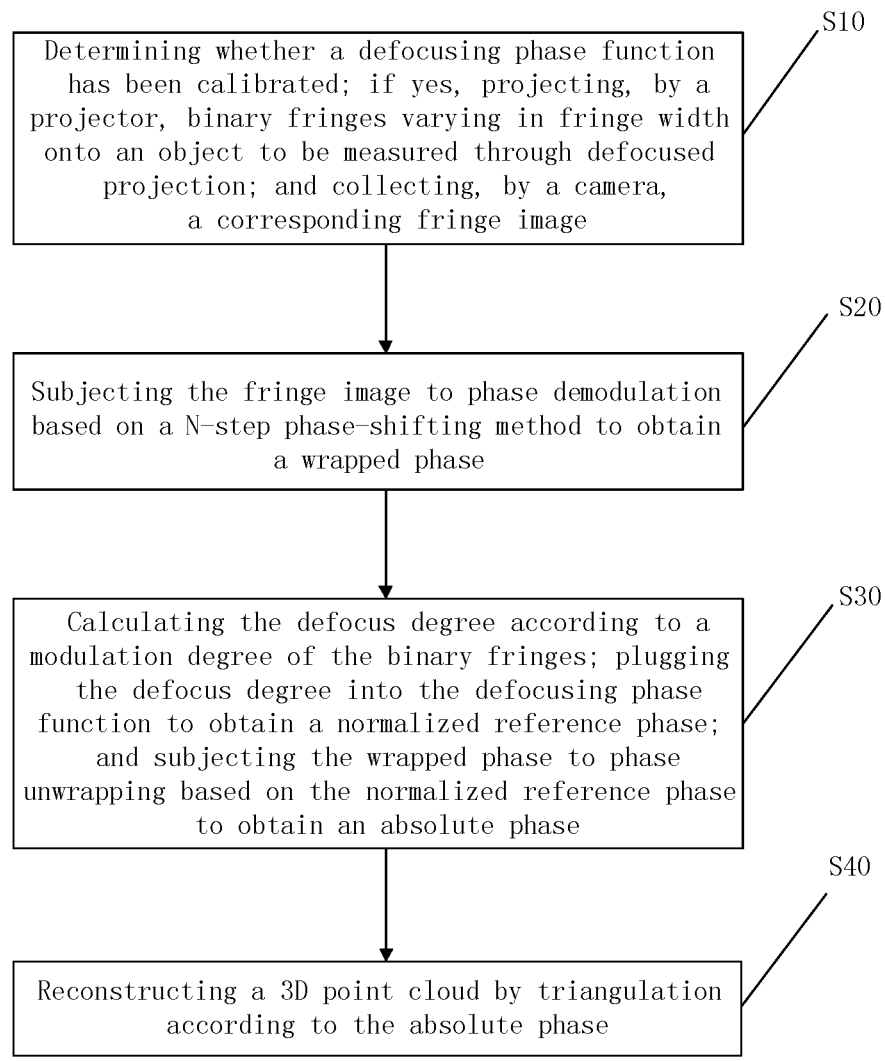
FIG. 3 is a flow chart of a structured light 3D measurement method based on defocus-degree-based unwrapping according to another embodiment of the present disclosure.

Referring to FIG. 3, a structured light 3D measurement method based on defocus-degree-based unwrapping includes the following steps.

(S10) Whether a defocusing phase function has been calibrated is determined. If yes, binary fringes varying in fringe width are projected onto an object to be measured through defocused projection by a projector. A fringe image of the binary fringes is collected by a camera.

(S20) The fringe image is subjected to phase demodulation by using a N-step phase-shifting method to obtain a wrapped phase.

(S30) A defocus degree is calculated according to a modulation degree of the binary fringes. The defocus degree is plugged into the defocusing phase function to obtain a normalized reference phase. The wrapped phase is subjected to phase unwrapping based on the normalized reference phase to obtain an absolute phase.

(S40) A 3D point cloud is reconstructed by triangulation according to the absolute phase.

Specifically, in step (S20), phase demodulation is performed by using a 31-step phase-shifting method.

In an embodiment, the structured light 3D measurement method further includes the following steps.

If the defocusing phase function has not been calibrated, a plane is taken as the object to be measured. The plane is located at a side of a focusing plane. A height of the plane relative to the projector is adjusted. The absolute phase is calculated through the N-step phase-shifting method as the normalized reference phase.

A pixel coordinate of the camera is taken as position unit. Defocus degrees under different position units and corresponding normalized reference phases are recorded to construct an expression of the defocusing phase function. Based on the expression, coefficients of the defocusing phase function at different pixel coordinates are calibrated by a least-squares method.

In an embodiment, the expression of the defocusing phase function is expressed as:

$$\underbrace{\begin{bmatrix} \sigma_1(u_c, v_c) & -\phi_1(u_c, v_c) & 1 \\ \vdots & \vdots & \vdots \\ \sigma_j(u_c, v_c) & -\phi_j(u_c, v_c) & 1 \\ \vdots & \vdots & \vdots \\ \sigma_J(u_c, v_c) & -\phi_J(u_c, v_c) & 1 \end{bmatrix}}_{A} \times \begin{bmatrix} b(u_c, v_c) \\ a(u_c, v_c) \\ c(u_c, v_c) + b(u_c, v_c)a(u_c, v_c) \end{bmatrix} =$$

$$\underbrace{\begin{bmatrix} \phi_1(u_c, v_c)\sigma_1(u_c, v_c) \\ \vdots \\ \phi_j(u_c, v_c)\sigma_j(u_c, v_c) \\ \vdots \\ \phi_J(u_c, v_c)\sigma_J(u_c, v_c) \end{bmatrix}}_{F};$$

where $\sigma_1(u_c, v_c)$, $\sigma_j(u_c, v_c)$ and $\sigma_J(u_c, v_c)$ represent defocus degrees recorded at different heights of the plane relative to the projector at a pixel coordinate $(u_c, v_c)$; J represents a total number of heights under which defocus degrees are recorded; $\phi_1(u_c, v_c)$, $\phi_j(u_c, v_c)$ and $\phi_J(u_c, v_c)$ are normalized reference phases at the pixel coordinate $(u_c, v_c)$; A and F are matrices; and $a(u_c, v_c)$, $b(u_c, v_c)$ and $c(u_c, v_c)$ are coefficients of the defocusing phase function at the pixel coordinate $(u_c, v_c)$.

The coefficients of the defocusing phase function at the pixel coordinate $(u_c, v_c)$ are calibrated through the following formula:

$$\begin{bmatrix} b(u_c, v_c) \\ a(u_c, v_c) \\ c(u_c, v_c) + b(u_c, v_c)a(u_c, v_c) \end{bmatrix} = (AA^T)^{-1} A^T F;$$

where $A^T$ is transpose of matrix A.

It should be noted that steps (S20)-(S40) can be referred to the corresponding steps in the previous method embodiments and will not be repeated here.

Based on mathematical analysis of defocus degree and phase, a concept of defocusing phase function is proposed to represent a defocus degree-phase functional relationship. Comparing with the multi-wavelength phase unwrapping method which relies on phase accuracy, the method provided herein is free of influence of phase error, such that a high-accuracy 3D measurement can be achieved even there are large phase error due to great depth variation.

It should be understood that the disclosed devices and methods can be implemented in other ways. The above-described device embodiments are merely illustrative of the disclosure. For example, the modules is only divided based on a logical function, and other divisions can be implemented. For example, multiple modules or components can be combined or can be integrated into another system, or some features can be ignored or not implemented. Furthermore, the mutual coupling or direct coupling or communication connection may be indirect coupling or communication connection through some interfaces, devices or modules, which may be electrical, mechanical or otherwise.

The modules described as separate components may be physically separate or not. The components displayed as modules may be physical modules, that is, they may be located in one place or distributed to multiple network modules. The application can be implemented by selecting some or all these modules according to actual needs.

In addition, functional modules can be integrated in a single processing module or arranged separately, or two or more modules can be integrated in a single module. The integrated modules can be implemented either in a form of hardware or software function modules.

The integrated modules can be stored in a non-transitory computer readable storage medium when implemented as software function modules to be sold or used. Accordingly, the technical solution can be embodied in the form of a software product. At least one instruction is stored in the medium, and the at least one instruction is loaded and executed by a processor (such as personal computers, servers and network devices) to achieve the method. The medium capable of storing program code is a USB flash disk, mobile hard disk, read-only memory (ROM), random access memory (RAM), disk or compact disc.

Described above are only some embodiments of the present disclosure, which are not intended to limit the disclosure. It should be understood that any variations, replacements and modifications made by those of ordinary skilled in the art without departing from the spirit of the disclosure should fall within the scope of the disclosure defined by the appended claims.

What is claimed is:

1. A structured light three-dimensional (3D) measurement method based on defocus-degree-based unwrapping, comprising:

acquiring, by a camera, a fringe image generated after defocused projection of binary fringes varying in fringe width onto an object to be measured; and acquiring a defocusing phase function that has been calibrated before the defocused projection of the binary fringes, wherein the defocusing phase function is configured to represent a defocus degree-phase functional relationship;

subjecting the fringe image to phase demodulation by using a N-step phase-shifting method to obtain a wrapped phase;

calculating a defocus degree according to a modulation degree of the binary fringes; plugging the defocus degree into the defocusing phase function to obtain a normalized reference phase; and subjecting the wrapped phase to phase unwrapping based on the normalized reference phase to obtain an absolute phase; and reconstructing a 3D point cloud by triangulation according to the absolute phase;

wherein the defocus degree is calculated through the following formula:

$$\begin{bmatrix} 1 & -\frac{2\pi^2}{T_1^2} \\ \vdots & \vdots \\ 1 & -\frac{2\pi^2}{T_m^2} \\ \vdots & \vdots \\ 1 & -\frac{2\pi^2}{T_M^2} \end{bmatrix} \times \begin{bmatrix} \ln\left(\frac{2a_2 E}{\pi}\right) \\ \sigma_h^2 \end{bmatrix} = \ln\begin{bmatrix} B(T_1)' \\ \vdots \\ B(T_m)' \\ \vdots \\ B(T_M)' \end{bmatrix};$$

wherein $T_1$ is a fringe width of a first binary fringe in the binary fringes; $T_m$ is a fringe width of a $m^{th}$ binary fringe in the binary fringes; $T_M$ is a fringe width of a $M^{th}$ binary fringe in the binary fringes; M is the number of the binary fringes; $v_h$ represents the defocus degree; $B(T_1)'$ is a modulation degree of the first binary fringe; $B(T_m)'$ is a modulation degree of the $m^{th}$ binary fringe; and $B(T_M)'$ is a modulation degree of the $M^{th}$ binary fringe.

2. The structured light 3D measurement method of claim 1, wherein the defocusing phase function is expressed as follows:

$$\phi_r(u_c, v_c) = \frac{c(u_c, v_c)}{\sigma_h(u_c, v_c) + a(u_c, v_c)} + b(u_c, v_c);$$

wherein $(u_c, v_c)$ is a pixel coordinate of the camera; $\phi_r(u_c, v_c)$ is a normalized reference phase at the pixel coordinate $(u_c, V_c)$; $a(u_c, v_c)$, $b(u_c, v_c)$ and $c(u_c, v_c)$ are coefficients of the defocusing phase function at the pixel coordinate $(u_c, v_c)$; and $\sigma_h(u_c, v_c)$ is a defocus degree at the pixel coordinate $(u_c, v_c)$; and the phase unwrapping is performed according to the following formula:

$$\begin{cases} \phi'(u_c, v_c) = \varphi(u_c, v_c) + 2\pi \times K(u_c, v_c) \\ K(u_c, v_c) = \text{round}\left[\dfrac{\phi_r(u_c, v_c) \times \dfrac{2\pi w}{T} - \varphi(u_c, v_c)}{2\pi}\right] \end{cases};$$

wherein $\phi'(u_c, v_c)$ is the absolute phase; $\varphi(u_c, v_c)$ is the wrapped phase; $K(u_c, v_c)$ represents a fringe order of the fringe image; w is a maximum value of a projection coordinate; t represents fringe width; and round is a function that rounds a number to the nearest integer.

3. A structured light 3D measurement device based on defocus-degree-based unwrapping, comprising:
a memory; and
a processor;
wherein the memory is configured to store an instruction, wherein the instruction is configured to be executed to implement the structured light 3D measurement method of claim 1; and
the processor is configured to execute the instruction.

4. A non-transitory computer readable storage medium, wherein the non-transitory computer readable storage medium is configured to store a computer program; and the computer program is configured to be executed to implement the structured light 3D measurement method of claim 1.

5. A structured light 3D measurement device based on defocus-degree-based unwrapping, comprising:
an acquisition module;
a wrapped phase solving module;
a phase unwrapping module;
a 3D measurement module;
wherein the acquisition module is configured to acquire a fringe image collected by a camera after defocused projection of binary fringes varying in fringe width onto an object to be measured, and a defocusing phase function that has been calibrated prior to the defocused projection, wherein the defocusing phase function is configured to represents a defocus degree-phase functional relationship;
the wrapped phase solving module is configured to perform phase demodulation on the fringe image based on a N-step phase-shifting method to obtain a wrapped phase;
the phase unwrapping module is configured to calculate a defocus degree according to a modulation degree of the binary fringes, plug the defocus degree into the defocusing phase function to obtain a normalized reference phase, and perform phase unwrapping on the wrapped phase based on the normalized reference phase to obtain an absolute phase; and
the 3D measurement module is configured to reconstruct a 3D point cloud by triangulation according to the absolute phase;
wherein the phase unwrapping module comprises a defocus degree calculation unit, and the defocus degree calculation unit is configured to calculate the defocus degree through the following formula:

$$\begin{bmatrix} 1 & -\dfrac{2\pi^2}{T_1^2} \\ \vdots & \vdots \\ 1 & -\dfrac{2\pi^2}{T_m^2} \\ \vdots & \vdots \\ 1 & -\dfrac{2\pi^2}{T_M^2} \end{bmatrix} \times \begin{bmatrix} \ln\left(\dfrac{2a_2 E}{\pi}\right) \\ \sigma_h^2 \end{bmatrix} = \ln\begin{bmatrix} B(T_1)' \\ \vdots \\ B(T_m)' \\ \vdots \\ B(T_M)' \end{bmatrix};$$

wherein $T_1$ is a fringe width of a first binary fringe in the binary fringes; $T_m$ is a fringe width of a $m_{th}$ binary fringe in the binary fringes; $T_M$ is a fringe width of a $M^{th}$ binary fringe in the binary fringes; M is the number of the binary fringes; $\sigma_h$ is the defocus degree; $B(T_1)'$ is a modulation degree of the first binary fringe; $B(T_m)'$ is a modulation degree of the $m^{th}$ binary fringe; and $B(T_M)'$ is a modulation degree of the Mth binary fringe.

6. The structured light 3D measurement device of claim 5, wherein the phase unwrapping module comprises a normalized reference phase calculation unit and an absolute phase calculation unit;
the normalized reference phase calculation unit is configured to plug the defocus degree into the defocusing phase function to obtain the normalized reference phase, wherein the defocusing phase function is expressed as:

$$\phi_r(u_c, v_c) = \frac{c(u_c, v_c)}{\sigma_h(u_c, v_c) + a(u_c, v_c)} + b(u_c, v_c);$$

wherein $(u_c, v_c)$ is a pixel coordinate of the camera; $\phi_r(u_c, v_c)$ is a normalized reference phase at the pixel coordinate $(u_c, v_c)$; $a(u_c, v_c)$, $b(u_c, v_c)$ and $c(u_c, v_c)$ are coefficients of the defocusing phase function at the pixel coordinate $(u_c, v_c)$; and $\sigma_h(u_c, v_c)$ is a defocus degree at the pixel coordinate $(u_c, v_c)$; and the absolute phase calculation unit is configured to perform phase unwrapping based on the normalized reference phase through the following formula to obtain the absolute phase:

$$\begin{cases} \phi'(u_c, v_c) = \varphi(u_c, v_c) + 2\pi \times K(u_c, v_c) \\ K(u_c, v_c) = \text{round}\left[\dfrac{\phi_r(u_c, v_c) \times \dfrac{2\pi w}{T} - \varphi(u_c, v_c)}{2\pi}\right] \end{cases};$$

wherein $\phi'(u_c, v_c)$ is the absolute phase; $\varphi(u_c, v_c)$ is the wrapped phase; $K(u_c, v_c)$ represents a fringe order of the fringe image; w is a maximum value of a projection coordinate; t represents fringe width; round is a function that rounds a number to the nearest integer.

7. A structured light 3D measurement method based on defocus-degree-based unwrapping, comprising:
- determining whether a defocusing phase function has been calibrated; if yes, projecting, by a projector, binary fringes varying in fringe width onto an object to be measured through defocused projection; and collecting, by a camera, a fringe image of the binary fringes;
- subjecting the fringe image to phase demodulation by using a N-step phase-shifting method to obtain a wrapped phase;
- calculating a defocus degree according to a modulation degree of the binary fringes; plugging the defocus degree into the defocusing phase function to obtain a normalized reference phase; and subjecting the wrapped phase to phase unwrapping based on the normalized reference phase to obtain an absolute phase; and
- reconstructing a 3D point cloud by triangulation according to the absolute phase;
- wherein the structured light 3D measurement method further comprises:
- if the defocusing phase function has not been calibrated, taking a plane as the object to be measured, and locating the plane at a side of a focusing plane; adjusting a height of the plane relative to the projector; and calculating the absolute phase through the N-step phase-shifting method as the normalized reference phase; and
- taking a pixel coordinate of the camera as position unit, and recording defocus degrees under different position units and corresponding normalized reference phases to construct an expression of the defocusing phase function; and based on the expression, calibrating coefficients of the defocusing phase function at different pixel coordinates by a least-squares method.

8. The structured light 3D measurement method of claim 7, wherein the expression of the defocusing phase function is expressed as:

$$\underbrace{\begin{bmatrix} \sigma_1(u_c, v_c) & -\phi_1(u_c, v_c) & 1 \\ \vdots & \vdots & \vdots \\ \sigma_j(u_c, v_c) & -\phi_j(u_c, v_c) & 1 \\ \vdots & \vdots & \vdots \\ \sigma_J(u_c, v_c) & -\phi_J(u_c, v_c) & 1 \end{bmatrix}}_{A} \times \begin{bmatrix} b(u_c, v_c) \\ a(u_c, v_c) \\ c(u_c, v_c) + b(u_c, v_c)a(u_c, v_c) \end{bmatrix} = \underbrace{\begin{bmatrix} \phi_1(u_c, v_c)\sigma_1(u_c, v_c) \\ \vdots \\ \phi_j(u_c, v_c)\sigma_j(u_c, v_c) \\ \vdots \\ \phi_J(u_c, v_c)\sigma_J(u_c, v_c) \end{bmatrix}}_{F};$$

wherein $\sigma_1(u_c, v_c)$, $\sigma_j(u_c, v_c)$ and $\sigma_J(u_c, v_c)$ represent defocus degrees recorded at different heights of the plane relative to the projector at a pixel coordinate $(u_c, v_c)$; J represents a total number of heights under which defocus degrees are recorded; $\phi_1(u_c, v_c)$, $\phi_j(u_c, v_c)$ and $\phi_J(u_c, v_c)$ are normalized reference phases at the pixel coordinate $(u_c, v_c)$; A and F are matrices; and $a(u_c, v_c)$, $b(u_c, v_c)$ and $c(u_c, v_c)$ are coefficients of the defocusing phase function at the pixel coordinate $(u_c, v_c)$; and the coefficients of the defocusing phase function at the pixel coordinate $(u_c, v_c)$ are calibrated through the following formula:

$$\begin{bmatrix} b(u_c, v_c) \\ a(u_c, v_c) \\ c(u_c, v_c) + b(u_c, v_c)a(u_c, v_c) \end{bmatrix} = (AA^T)^{-1} A^T F;$$

wherein $A^T$ is transpose of matrix A.

* * * * *